United States Patent
Hashidate et al.

(10) Patent No.: US 6,174,115 B1
(45) Date of Patent: Jan. 16, 2001

(54) SPINDLE FOR MACHINE TOOLS

(75) Inventors: Akitake Hashidate; Masami Sugahara; Keita Misawa, all of Kanagawa (JP)

(73) Assignee: Sodick Co., Ltd., Kanagawa (JP)

( * ) Notice: Under 35 U.S.C. 154(b), the term of this patent shall be extended for 0 days.

(21) Appl. No.: 09/194,420

(22) PCT Filed: Mar. 27, 1998

(86) PCT No.: PCT/JP98/01418

§ 371 Date: Oct. 4, 1999

§ 102(e) Date: Oct. 4, 1999

(87) PCT Pub. No.: WO98/43764

PCT Pub. Date: Oct. 8, 1998

(30) Foreign Application Priority Data

Mar. 28, 1997 (JP) ................................................... 9-095172

(51) Int. Cl.[7] .................................................. B23C 9/00
(52) U.S. Cl. ........................ 409/231; 76/101.1; 409/233
(58) Field of Search ............................. 409/231, 233; 76/101.1, 108.1, 115; 425/404, 445; 51/307, 309; 501/96.1, 97.1, 97.2

(56) References Cited

U.S. PATENT DOCUMENTS

| | | | |
|---|---|---|---|
| 2,166,101 | * | 7/1939 | Moller .................................. 409/231 |
| 2,434,639 | * | 1/1948 | Bugatti ................................. 409/231 |
| 2,924,152 | * | 2/1960 | Zettler ................................. 409/233 |
| 3,481,248 | * | 12/1969 | Engstrom ............................. 409/233 |
| 3,584,621 | * | 6/1971 | Bird ..................................... 409/233 |
| 3,762,271 | * | 10/1973 | Poincenot ............................. 409/233 |
| 4,011,791 | * | 3/1977 | Lanzenberger ....................... 409/233 |
| 4,704,056 | * | 11/1987 | Babel ................................... 409/233 |
| 4,705,440 | * | 11/1987 | Babel ................................... 409/233 |
| 4,919,689 | * | 4/1990 | Pyzik et al. ............................ 51/309 |
| 5,018,915 | * | 5/1991 | Inokuma et al. ..................... 409/231 |
| 5,372,568 | * | 12/1994 | Matsuoka ............................... 483/56 |
| 5,507,962 | * | 4/1996 | Jahanmir et al. ........................ 72/42 |
| 5,758,999 | * | 6/1998 | Geise ................................... 409/231 |

FOREIGN PATENT DOCUMENTS

| | | | |
|---|---|---|---|
| 0292021 | * | 11/1988 | (DE) ..................................... 409/233 |
| 61-131840 |  | 6/1986 | (JP). |
| 62-88502 |  | 6/1987 | (JP). |
| 62-228303 |  | 7/1987 | (JP). |
| 62-31202 |  | 11/1987 | (JP). |
| 63-35502 |  | 3/1988 | (JP). |
| 2-167602 |  | 6/1990 | (JP). |
| 4-16284 |  | 3/1992 | (JP). |
| 9-47903 |  | 2/1997 | (JP). |
| 1445903 | * | 12/1988 | (SU) ..................................... 409/231 |

* cited by examiner

Primary Examiner—Daniel W. Howell
(74) Attorney, Agent, or Firm—McDermott, Will & Emery

(57) ABSTRACT

A machine tool spindle (1) having a through hole capable of housing a collect (30) which grips a tool holder (31) and a draw bar (27) to which the collect (30) is attached, and a tapered inner surface which holds the tool holder; the spindle being made of ceramic as a single cylindrical body. The single cylindrical body has a pair of enlongated holes (2) through which a pin (24) which moves the draw bar (27) in the axial direction of the spindle (1) penetrates. The spindle (91) is preferably made of silicon nitride ceramic, and has a thickness greater than about 0.1 times its outer diameter and greater than about 0.02 times its length.

14 Claims, 4 Drawing Sheets

SPINDLE FOR MACHINE TOOLS

FIELD OF THE INVENTION

The present invention relates to a machine tool spindle. More particularly, the present invention relates to a machine tool spindle which transmits a high speed rotational force to a tool.

BACKGROUND OF THE INVENTION

In order to increase the cutting speed of machine tools such as machining centers, a high rotational speed is desired for spindles which transmit rotational force to a tool while the tool is held in place. To achieve a high spindle rotational speed requires consideration of items such as lubrication or cooling of the bearing and the dynamic balance of rotating portions, including the spindle. In addition, it is important to increase the static rigidity and fhe dynamic rigidity of the spindle, and to reduce its thermal deformation and inertial force.

In general, all or most parts of the spindle are made of carbon steel or steel alloys. Rapid acceleration and rapid deceleration of high specific gravity steel spindles is limited by large inertial force. Therefore, in order to reduce inertial force, it is desirable to reduce the specific gravity of the spindle with out sacrificing strength.

Machine tool spindles are known in which a ceramic cylindrical body having a tapered inner surface which clamps a tool holder is joined to a steel spindle body. However, the bonding between two parts of differing coefficients of expansion may loosen.

SUMMARY OF THE INVENTION

An object of the present invention is to provide a light weight spindle capable of rapid acceleration and rapid deceleration.

Another object of the present invention is to provide a spindle having a small coefficient of expansion and uniformity of expansion.

Other objects of the present invention are partially described in the explanation which follows, and will in part be apparent to practitioners of the art through practice of the invention.

In order to achieve the above and other objectives, a spindle according to the present invention is provided having a through hole capable of holding a part which grasps a tool holder and a tapered inner surface for holding the tool holder, made from a single cylindrical body of ceramic material.

The single cylindrical body preferably is made of silicon nitride ceramic. The single cylindrical body preferably includes a key capable of fitting into a key way in a tool holder.

The spindle thickness is preferably greater than about 0.1 times the outer diameter and longer than about 0.02 times the length.

PRESENTLY PREFERRED EMBODIMENT OF THE INVENTION

Figure 1:
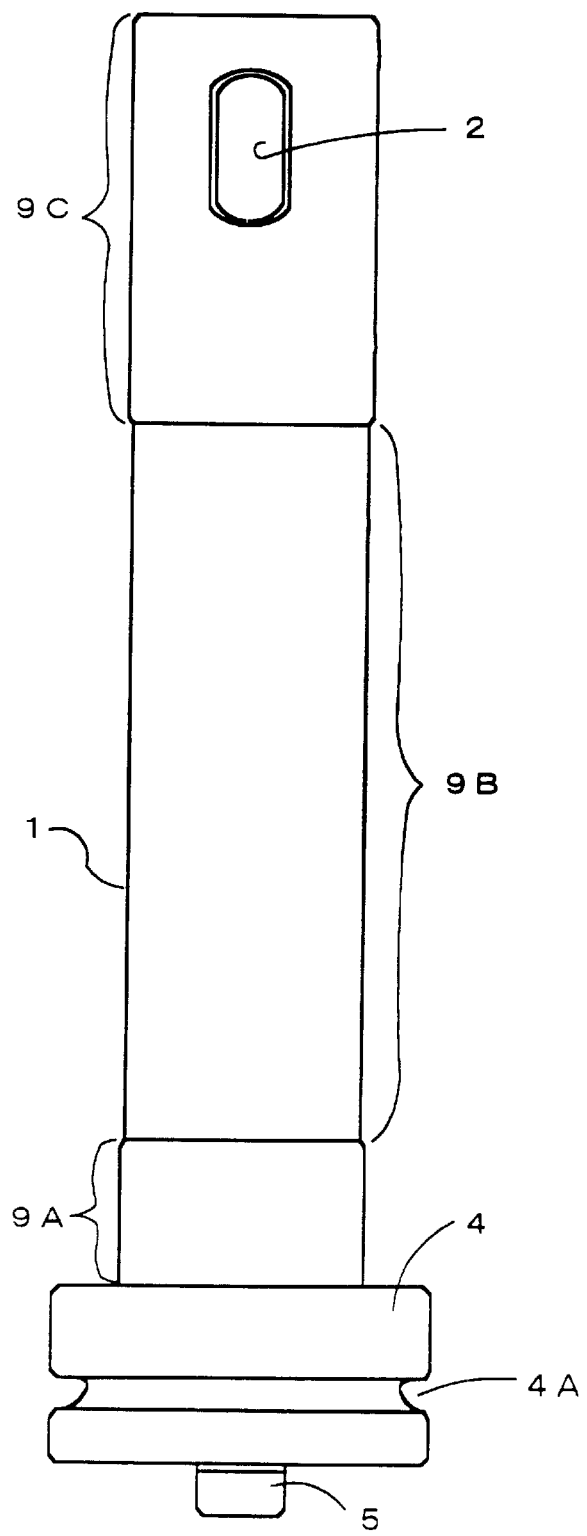
FIG. 1 is a front elevation of a spindle according to the spindle of the present invention.

An example of a machine tool spindle based on the present invention will now be explained with reference to FIG. 1, FIG. 2, and FIG. 3.

The spindle 1 of the present invention comprises a single cylindrical body having a through hole which houses hardware to grab a tool holder. All parts of the spindle 1 are formed of a ceramic which is light in weight relative to steel, and has a high Young's modulus, high corrosion-resistance, high wear-resistance, high heat resistance, and low thermal expansion coefficient.

Figure 2:
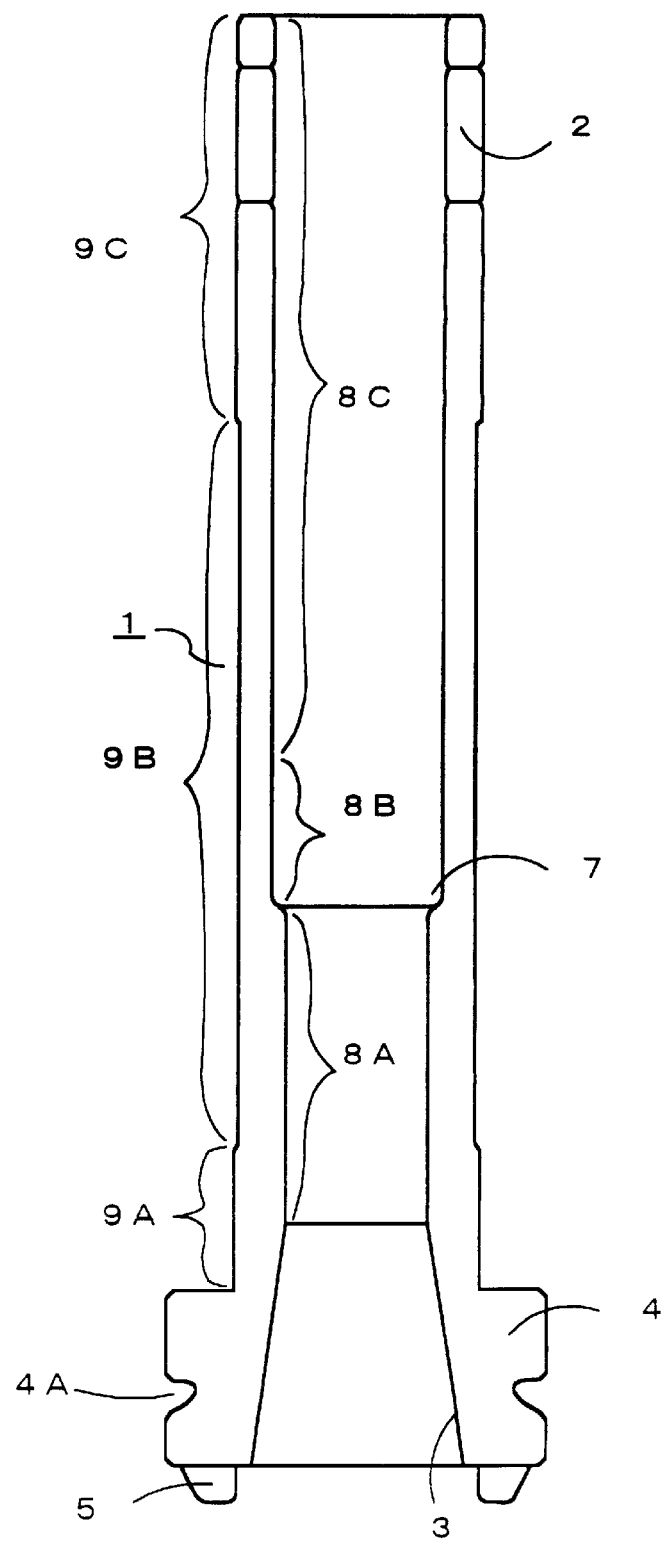
FIG. 2 is a vertical section of the spindle of a spindle according to the present invention.
Figure 3:
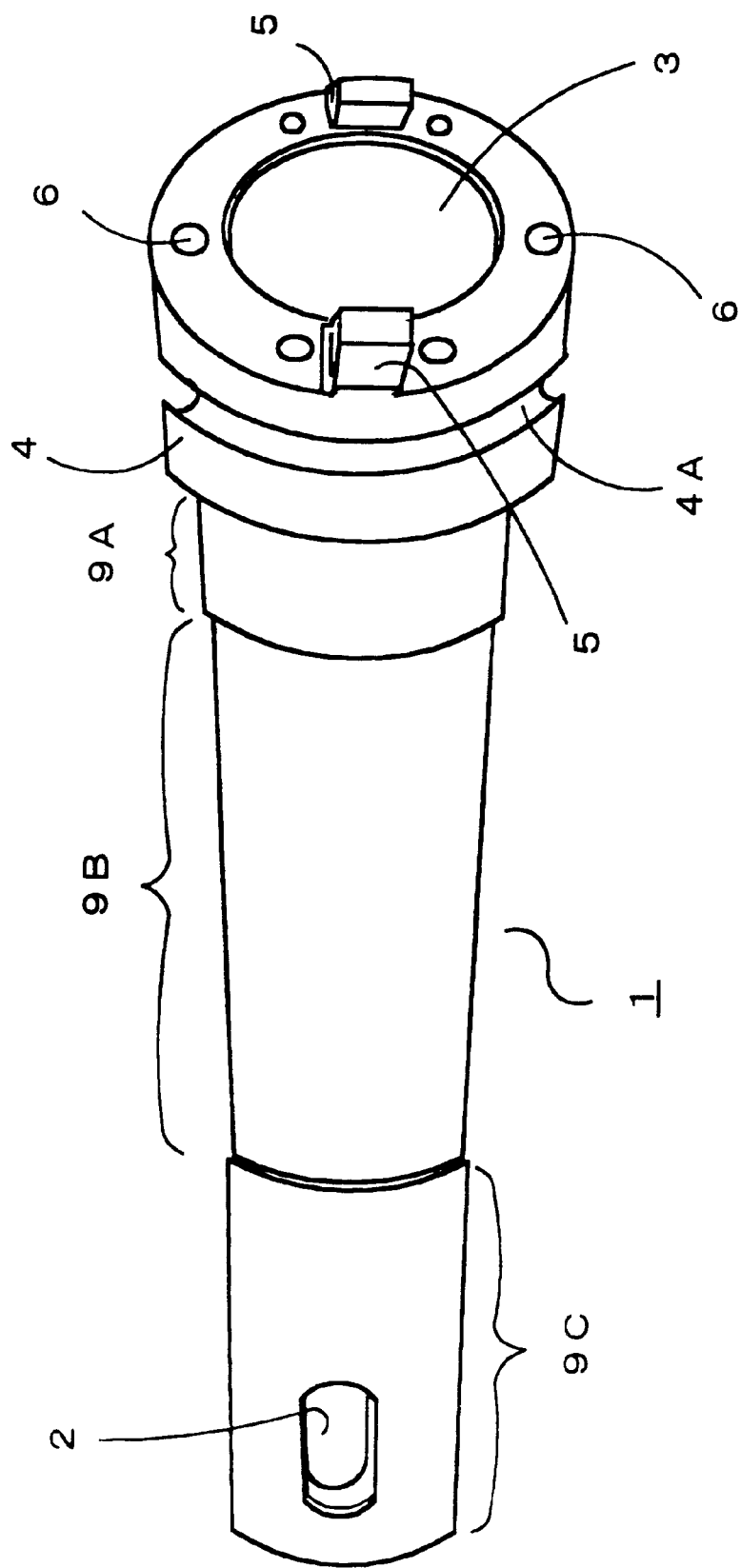
FIG. 3 is a perspective view of the spindle of a spindle according to the present invention.

The spindle 1 in FIG. 2 and FIG. 3 may, its top end, be connected to the rotating shaft of a motor by means of an appropriate coupling, and at its bottom end fit into a tool holder. An opposing pair of long holes 2, facing the shaft of the spindle 1, are formed on the top end thereof. The respective long holes 2 are elongated in the axial direction of the spindle 1. A pin or rod-shaped body can penetrate the spindle 1 and can move axially in the spindle 1 by means of this pair of long holes 2. As is best shown in FIG. 2, the spindle 1 has a tapered inside surface 3 which opens out to the bottom end thereof so as to be able to grip a tool holder. The tapered inner surface 3, which contacts the tool holder directly, receives a force which raises the tool holder in the upward direction as viewed in FIG. 2. Therefore, a maximum outer diameter flange portion 4 is formed on the bottom end of the spindle 1 such that the thickness of the bottom end of the spindle 1 will be larger than other portions of the spindle. With respect to a spindle 1 having a diameter of about 43 mm at the bottom end opening, the flange portion 4 would have a length of about 27 mm and an outer diameter of about 70 mm. An air reservoir 4A is formed along the outer perimeter of the flange portion 4. Two keys 5, which fit into a key channel formed in the tool holder, are formed on the bottom side of the flange portion 4. Furthermore, as shown in FIG. 3, multiple holes 6, in which balance weights are attached, are formed on the bottom surface of the flange portion 4. In the illustrated example, sections 9A, 9B, and 9C, other than the flange portion 4, have an approximately 60 mm outer diameter and an approximately 300 mm length. However, in order to facilitate the shrink-fitting process, in which the bearing is caused to fit onto the spindle 1 adjacent to the flange portion 4, the outer diameter of the spindle 1 central portion 9B is slightly smaller, for example, smaller than the parts 9A and 9C adjacent to part 9B.

As is illustrated in FIG. 2, a step portion 7 having inner that changes, is formed in the center portion of the spindle 1. The inner diameter of the spindle 1 is smallest in the straight inner surface 8A from the step portion 7 to the taper inside surface 8A, which extends at approximately 40 mm having an the outer diameter of approximately 60 mm. The spindle 1 has a straight inner surface 8B over a fixed length extending upward from the step portion 7. Furthermore, a part for grabbing a tool holder is formed on the tapered inner surface 8C, which very slightly opens out from the straight inner surface 8B toward the top end of the spindle 1 so as to be easily insertable into the through hole. In order to obtain sufficient strength, the spindle 1 requires a thickness which is greater than about 0.1 times the outer diameter and greater than about 0.02 times the length. Stated more concretely, in the illustrated sections 9A, 9B, and 9C, a thickness of greater than about 0.1 times the exemplary approximately 60 mm outer diameter and greater than about 0.02 times the exemplary approximately 300 mm length is required. It is important that the corners of the spindle 1 be rounded so that chipping or splitting does not occur when placed in contact with other parts.

As is best shown in FIG. 2, for example, appropriate roundness is imparted to the perimeter edges of the through hole opening, to be edges of the respective openings of the elongated holes 2, to the perimeter edges of the flange portion 4, and to the corners of the key 5.

The spindle 1 is preferably made of silicon nitride ceramic, which among ceramic materials has superior strength, thermal shock resistance, and wear resistance. Alumina ceramic has a high hardness and low weight, but a low bending strength. Zirconia ceramic has a high strength and low thermal conductivity, but a high density, and does not contribute much to spindle weight reduction. Silicon carbide ceramic has a low thermal conductivity, but low in mechanical strength.

An example of the spindle 1 fabrication method is describe below.

First, a silicon nitride (Si3N4) powder is blended with a $Al_2O_3$ or AlN sintering additive. Materials such as Be, SrO, etc. may be further added to that mixture. The mixed material is formed into a spindle having through holes, for example, by an isostatic press method. The resulting formed body is sintered using, for example, either a pressure sintering method or a pressurized sintering method. In order to make the density and strength of the spindle 1 uniform, it is desirable to pass a heated gas through the through holes in the spindle while the spindle is suspended in a furnace such that the spindle shaft is plumb during sintering. After finishing by turning with a diamond tool, the sintered body is annealed.

All parts of the spindle 1 are made of silicon nitride ceramic, and therefore extremely light weight: approximately ⅓ that of steel spindles. Also, the spindle 1 is a single piece formed of one material and therefore includes no joined portions, which can cause reductions in strength.

Figure 4:
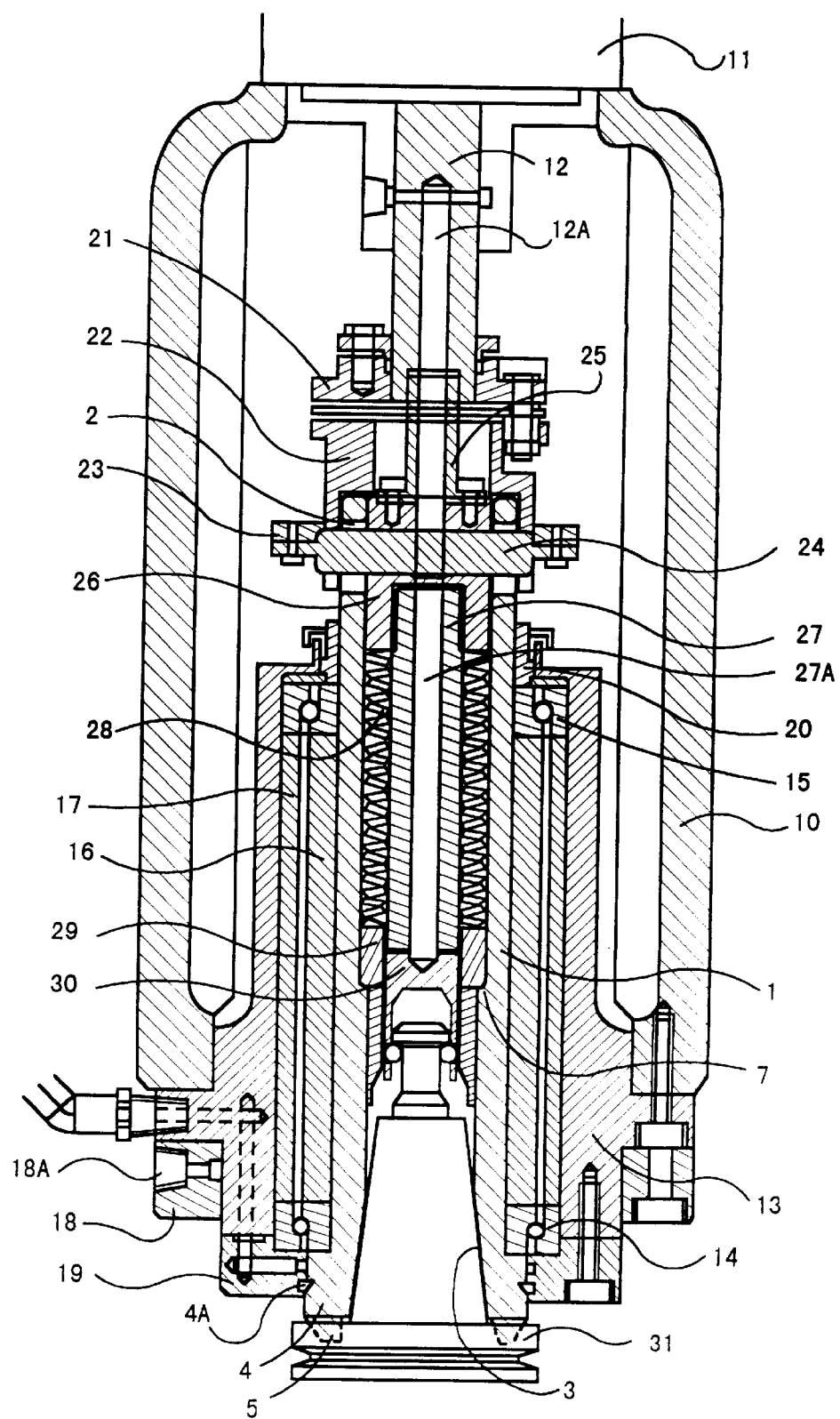
FIG. 4 is a vertical section of the head portion of a machining center using the spindle of the present invention.

A machining center which uses the spindle of the present invention will now be explained with reference to FIG. 4.

A motor 11 is connected to the top end of a cylindrical frame 10 such that the rotating shaft 12 thereof is positioned coaxially with the spindle 4. Holes 12 for the introduction of pressurized air and coolant are formed in the rotating shaft 12 of the motor 11. A coupling plate 21 is affixed to the rotating shaft 12. A cylindrical coupling 22 is linked at its top edge to a coupling plate 21, and on the bottom edge thereof a cavity in which the top end of the spindle 1 will fit is formed. Furthermore, an elongated hole, corresponding to the elongated holes 2 in the spindle 1 are formed on the bottom edge of the cylindrical coupling 22. A pin 24 penetrates the elongated holes 2 in the spindle 1, and fits into the cylindrical coupling 22 long hole. The pin 24 can move in the spindle 1 axial direction relative to the spindle 1 and the cylindrical coupling 22. The two ends of the pin 24 are affixed to a ring-shaped plate 23 which is provided around the outer perimeter of the cylindrical coupling 22. In this manner, the rotational force of the motor 11 is transmitted to the spindle 1 through the rotating shaft 12, the coupling plate 21, the cylindrical coupling 22, and the pin 24. A connecting rod 25 fits at one of its ends into the rotating shaft 12 so as to be able to move in it axial direction thereof, and at the other end to a connecting piece 26. The connecting piece 26 has a through hole into which the pin 24 fits; the connecting piece 26 is screwed onto the top end of a draw bar 27. The draw bar 27 has a coolant supply hole 27A; the hole 27A connects with the hole 12A of the rotating shaft 12 by means of the coolant supply holes respectively formed in the connecting rod 25, the connecting part 26, and the pin 24. A collet 30, which holds a knob on a tool holder 31, is attached to the bottom end of the draw bar 27. A collar 29 is affixed to the step portion 7 of the spindle 1. A plate spring 28, which pushes the draw bar 27 up, (as viewed in FIG. 4) is provided between the collar 29 and the connecting piece 26. When the pin 24 is pushed down by, for example, an air cylinder, in opposition to the plate spring 28, the collet 30 releases the tool holder 31.

A casing 13, which covers the spindle 1, is affixed to the cylindrical frame 10. A ring-shaped nozzle flange 18, formed around a hole 18A for introducing coolant, is attached to the outer perimeter of the casing 13. A seal flange 19 is attached to the lower edge of the casing 13 so as to surround the flange portion 4 of the spindle 1. The spindle 1 is supported by upper and lower angular bearings 14 and 15, which have ceramic spheres. Inner ring spacer 16 and outer ring spacer 17 are provided between the angular bearings 14 and 15. A step sleeve 20 is affixed to the outer perimeter of the spindle 1, which, together with the casing 13, receives the pressure imparted to the bearing 14.

For example, in accordance with the present invention, the spindle 1, fitted with a ball end milling tool, reached 6000 rpm in 0.2 seconds, and 10,000 rpm in 0.4 seconds. Also, the temperature rise of the spindle 1 was within a mere 3 degrees after 24 hours of continuous operation.

It is not intended that the present invention be limited to the form disclosed. It is clear that numerous improvements and variations are possible by referring to the above description.

The illustrated embodiment was selected in order to explain the essence and practical application of the present invention. The scope of the invention is defined by the attached.

What is claimed is:

1. A machine tool spindle for transmitting a high speed rotational force to a tool comprising, a cylindrical body formed from a single ceramic body made of silicon nitride and having an axial bore for holding a tool holder gripper and a tapered inner surface for receiving a tool holder.

2. A method of forming a machine tool spindle from a single ceramic body comprising the steps of:

blending a silicon nitride powder and a sintering additive to provide a blended material;

forming the blended material into a spindle body having thorough holes; and sintering the spindle body.

3. The spindle machine tool according to claim 1, further comprising a portion for fitting into a tool holder key way.

4. The machine tool spindle according to claim 1, further comprising a pair of opposing elongated holes facing the rotational axis of the spindle and extending a direction of the rotational axis.

5. The machine tool spindle according to claim 1, wherein the spindle thickness is greater than about 0.1 times the outer diameter and greater than about 0.02 times the length thereof.

6. The method according to claim 2 further comprising the step of finishing the spindle after sintering by turning it against a tool.

7. The method according to claim 2 wherein the sintering additive is selected from the group comprising $Al_2O_3$ and AlN.

8. The method according to claim 2 wherein the step of blending further comprising the step of adding materials selected from the group comprising Be and SrO to the blended material.

9. The method according to claim 2 wherein the step of forming further comprises isostatically pressing the blended material.

10. The method according to claim 2 wherein the step of sintering comprises use of pressure sintering.

11. The method according to claim 2 wherein the step of sintering comprises use of pressurized sintering.

12. The method according to claim 2 wherein the step of sintering uses a sintering furnace and further comprising the step of passing a heated gas through the through holes while the spindle is suspended in the sintering furnace.

13. The method according to claim 6 wherein the tool comprises a diamond tool.

14. The method according to claim 6 further comprising the step of annealing the spindle after the step of finishing.

* * * * *